United States Patent
Chan et al.

(10) Patent No.: US 9,389,373 B2
(45) Date of Patent: Jul. 12, 2016

(54) OPTICAL CONNECTOR

(71) Applicants: Eric Y. Chan, Mercer Island, WA (US);
Dennis Gary Koshinz, Belleuve, WA (US)

(72) Inventors: Eric Y. Chan, Mercer Island, WA (US);
Dennis Gary Koshinz, Belleuve, WA (US)

(73) Assignee: THE BOEING COMPANY, Chicago, IL (US)

( * ) Notice: Subject to any disclaimer, the term of this patent is extended or adjusted under 35 U.S.C. 154(b) by 469 days.

(21) Appl. No.: 13/625,511

(22) Filed: Sep. 24, 2012

(65) Prior Publication Data

US 2014/0086537 A1    Mar. 27, 2014

(51) Int. Cl.
*G02B 6/38* (2006.01)
*G02B 6/42* (2006.01)
*G02B 6/43* (2006.01)

(52) U.S. Cl.
CPC .............. *G02B 6/421* (2013.01); *G02B 6/4246* (2013.01); *G02B 6/4269* (2013.01); *G02B 6/43* (2013.01); *G02B 6/3894* (2013.01); *G02B 6/4292* (2013.01); *Y10T 29/49002* (2015.01)

(58) Field of Classification Search
None
See application file for complete search history.

(56) References Cited

U.S. PATENT DOCUMENTS

| 3,790,791 | A  | * | 2/1974 | Anderson | G02B 6/4292 250/227.24 |
| 4,773,723 | A  | * | 9/1988 | Cuda | F21V 29/004 165/169 |
| 5,111,476 | A  | * | 5/1992 | Hollenbeck | G02B 6/4226 372/107 |
| 6,652,158 | B2 | * | 11/2003 | Bartur | G02B 6/4202 385/88 |
| 7,210,862 | B2 | * | 5/2007 | Yoshikawa et al. | 385/92 |
| 7,850,374 | B2 | * | 12/2010 | Vancoille | G02B 6/4201 385/14 |
| 2002/0102074 | A1 | | 8/2002 | Nakura et al. | |
| 2004/0071412 | A1 | | 4/2004 | Nakura et al. | |
| 2005/0286579 | A1 | | 12/2005 | Yoshikawa et al. | |
| 2011/0268397 | A1 | | 11/2011 | Meadowcroft et al. | |
| 2012/0027415 | A1 | | 2/2012 | Chan et al. | |

OTHER PUBLICATIONS

"369 Series," TE Connectivity, copyright 2012, 1 page, accessed Sep. 25, 2012 http://www.deutsch.net/en/browse-products/connectors/coupling-systems/latching/d369-series.html.
"D38999 Optical Transceivers," PROTOKRAFT, copyright 2012, 2 pages, accessed Sep. 24, 2012 http://www.protokraft.com/products/optical-transceivers/d38999-29504.
Extended European Search Report, dated Jan. 23, 2014, regarding Application No. EP13185036.4, 8 pages.

* cited by examiner

*Primary Examiner* — John M Bedtelyon
(74) *Attorney, Agent, or Firm* — Yee & Associates, P.C.

(57) ABSTRACT

An optical connector comprising a connecting structure, an optical receiver located within the connecting structure, an optical transmitter located within the connecting structure, and a heat sink located within the connecting structure. The heat sink is configured to conduct heat away from the optical receiver and the optical transmitter. The optical receiver and the optical transmitter are thermally connected to the heat sink.

19 Claims, 17 Drawing Sheets

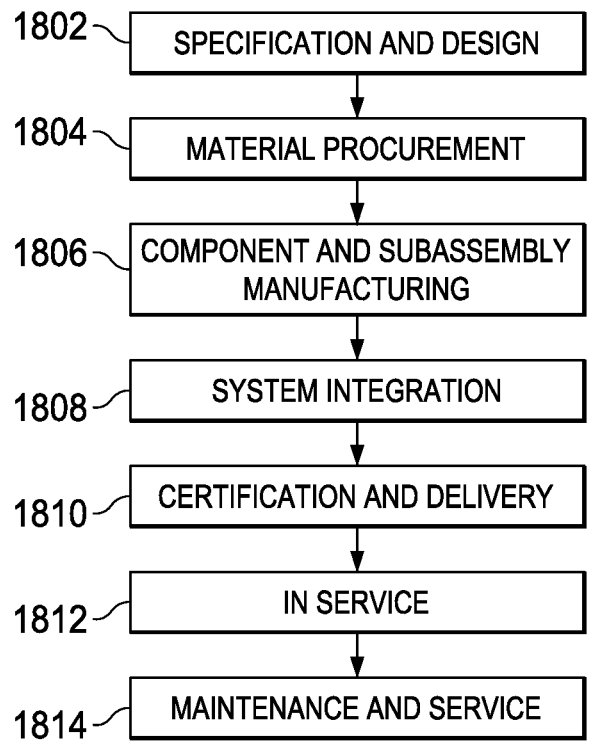
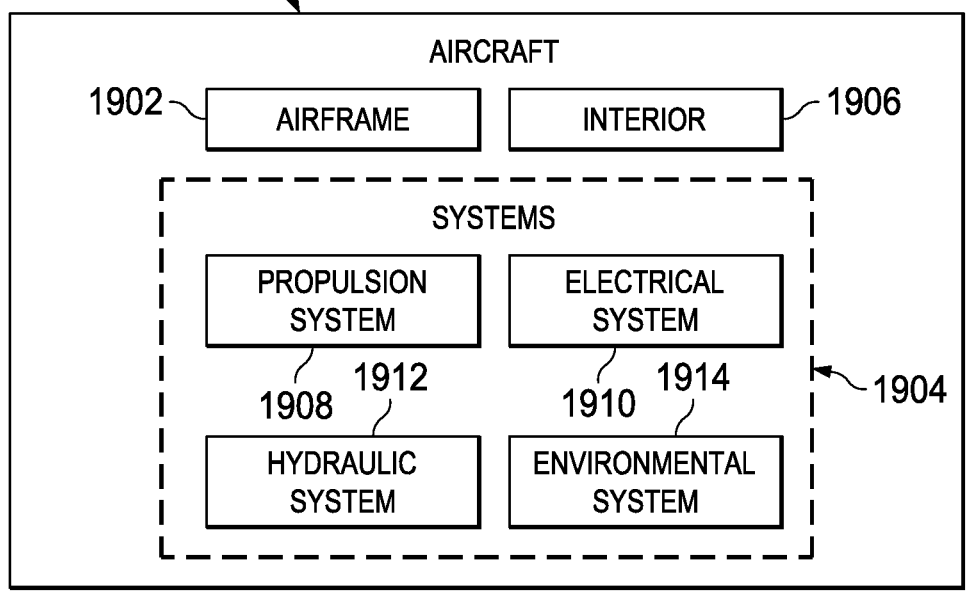

OPTICAL CONNECTOR

BACKGROUND INFORMATION

1. Field

The present disclosure relates generally to optical networks and, in particular, to optical networks on an aircraft. Still more particularly, the present disclosure relates to a method and apparatus for manufacturing optical connectors for media converters for coupling devices using electrical signals to an optical network.

2. Background

Aircraft network data processing systems currently use communications links formed using metal wires. These metal wires provide connections to exchange information between different devices in the network data processing systems within the aircraft. These devices may include, for example, a flight management system, an environmental system, a sensor system, an in-flight entertainment system, an electronic flight bag, and other components that may be used within an aircraft.

The use of metal wires may result in more space being used and more weight being present in the aircraft than desired. For example, the different metal wires may be placed into wiring bundles. The diameter of the metal wires may make these wiring bundles larger than desired. Further, as the number of metal wires needed increases, the weight of these wire bundles may be greater than desired.

In addition to the size and weight of the metal wires, other components used to connect these metal wires to form a network also may be heavier and larger than desired. For example, couplers, terminators, mounting panels, and other components that are used to form the network data processing system also may add more weight and size than desired within the aircraft.

One manner in which weight and size may be reduced is through using optical fibers in place of metal wires. An optical fiber is a flexible and transmissive optical waveguide that may be made of silica, plastic, or other materials having desirable capabilities to carry optical signals. Optical fibers are thinner and lighter than a metal wire or a wire bundle and optical fibers have much higher bandwidth than metal wire. Optical fibers may take various forms. For example, optical fibers may take the form of glass optical fibers or plastic optical fibers.

The use of optical fibers may be more desirable than the use of metal wires for other reasons other than size and weight. For example, optical fibers may permit transmission of optical signals over longer distances and at higher data rates than metal wires. Optical signals sent over optical fibers may also have a lower loss as compared to electrical signals sent over metal wires.

Further, the use of optical fibers is also desirable because these types of fibers are immune to electromagnetic interference. These and other characteristics make the use of optical fibers for transmitting information between devices in a network data processing system desirable for vehicles such as aircraft and spacecraft. Further, it is desirable for the optical fibers to meet the same requirements as the metal wires that they replace in an aircraft.

With new aircraft, optical networks may be designed and installed in those aircraft from the beginning. With existing aircraft, aircraft may be refurbished or upgraded to include optical networks. For example, optical fibers may be used to replace electrical data buses, wires, and other equipment for an electrical network. This replacement may be performed in the design of a new aircraft or in the refurbishment of an aircraft.

In some cases, some devices needed in the aircraft may be unavailable in a version or design that uses optical signals. In these situations, optical media converters may be used to provide communications between devices using electrical signals and other components in an optical network. An optical media converter is configured to convert electrical signals into optical signals and optical signals into electrical signals.

Currently available optical media converters may be heavier and bulkier than desired for use in an aircraft. Additionally, many of the currently available optical media converters may not provide conversion between electrical and optical signals with a desired level of performance. Further, the optical media converters may not perform as desired within the environment present during operation of the aircraft.

Therefore, it would be desirable to have a method and apparatus that takes into account at least some of the issues discussed above, as well as other possible issues.

SUMMARY

In one illustrative embodiment, an optical connector comprises a connecting structure, an optical receiver located within the connecting structure, an optical transmitter located within the connecting structure, and a heat sink located within the connecting structure. The heat sink is configured to conduct heat away from the optical receiver and the optical transmitter. The optical receiver and the optical transmitter are thermally connected to the heat sink.

In another illustrative embodiment, a method for manufacturing an optical connector is present. A dielectric structure is connected to an interior of an optical connector. A first pin and a second pin within a dielectric structure are positioned in a desired position. The first pin and the second pin within the dielectric structure are connected in the desired position for the first pin and the second pin. A heat sink is placed into the optical connector. An optical receiver and an optical transmitter are connected to the dielectric structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 18 is an illustration of an aircraft manufacturing and service method in accordance with an illustrative embodiment; and FIG. 19 is an illustration of an aircraft in which an illustrative embodiment may be implemented.

DETAILED DESCRIPTION

The illustrative embodiments recognize and take into account one or more different considerations. For example, the illustrative embodiments recognize and take into account that currently available optical media converters are typically configured for use with glass optical fibers. With respect to aircraft, plastic optical fibers may be desirable in place of glass optical fibers because glass optical fibers may be more expensive to maintain and install than desired. For example, glass optical fibers break more easily than plastic optical fibers during installation within the aircraft. Further, because of the small size of glass optical fibers, these fibers may be more expensive to maintain in dusty and greasy environments than desired. Plastic optical fibers with a larger diameter, a larger bend radius, and a higher durability than glass optical fibers may reduce the installation and maintenance cost of an airplane with fiber optic networks.

The illustrative embodiments recognize and take into account that having optical connectors for optical media converters with a sufficiently small size and a desired level of performance are unavailable with currently available optical connectors. Further, many of the available optical connectors are configured for use with glass optical fibers and not with plastic optical fibers.

Thus, the illustrative embodiments provide a method and apparatus for exchanging signals. In one illustrative example, an optical connector comprises a connecting structure, an optical receiver, an optical transmitter, and a heat sink. The heat sink is located within a connecting structure and is configured to conduct heat away from the optical receiver and optical transmitter. The optical receiver and optical transmitter are thermally connected to the heat sink.

Figure 1:
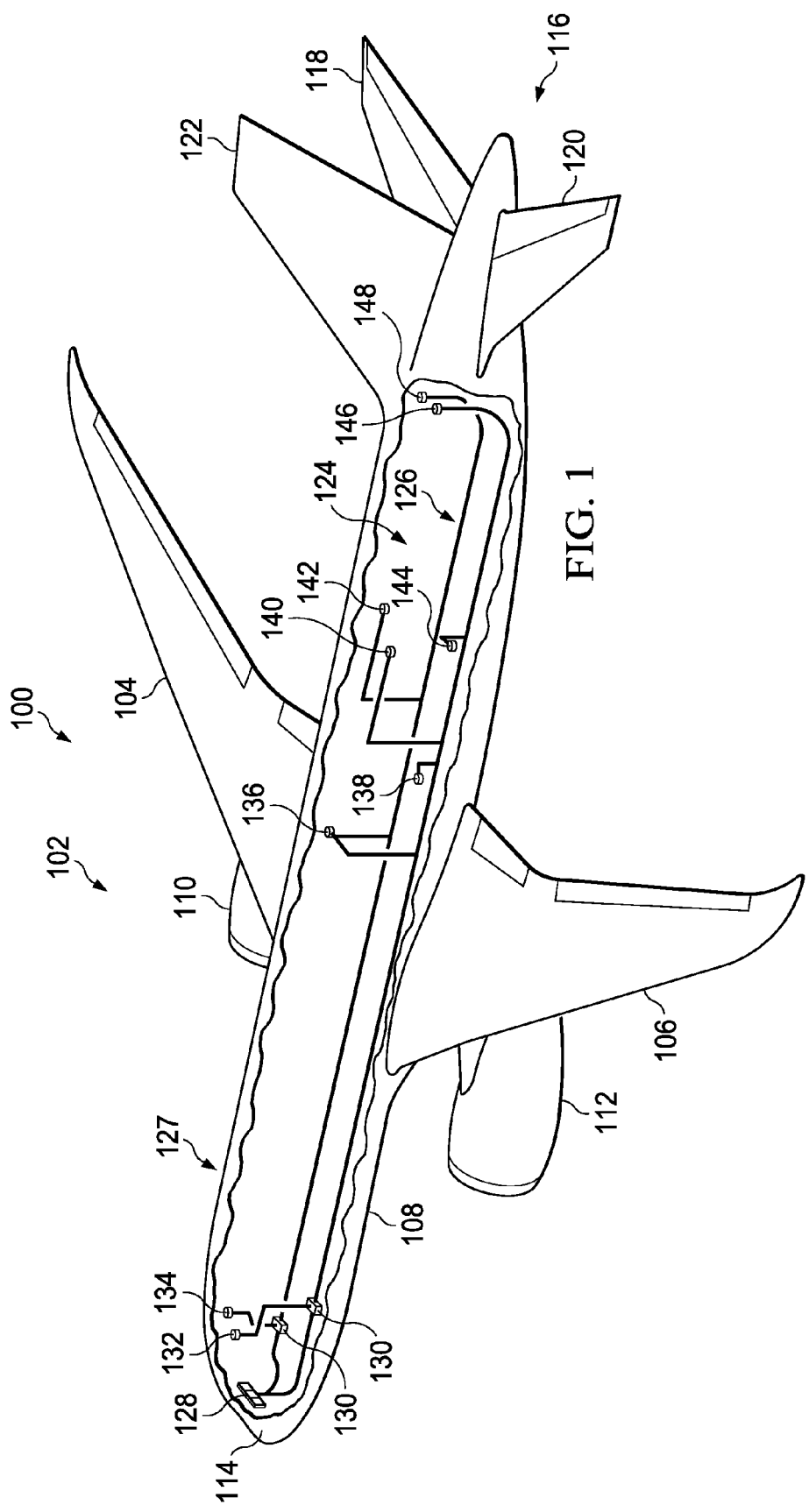
FIG. 1 is an illustration of a network environment in accordance with an illustrative embodiment.

With reference now to the figures and, in particular, with reference to FIG. 1, an illustration of a network environment is depicted in accordance with an illustrative embodiment. In this depicted example, network environment 100 comprises aircraft 102. As depicted, aircraft 102 is an example of a platform in which an illustrative embodiment may be implemented.

In this illustrative example, aircraft 102 has wing 104 and wing 106 attached to fuselage 108. Aircraft 102 also includes engine 110 attached to wing 104 and engine 112 attached to wing 106. Aircraft 102 also has nose section 114 and tail section 116. Tail section 116 includes horizontal stabilizer 118, horizontal stabilizer 120, and vertical stabilizer 122.

In these illustrative examples, network data processing system 124 comprises optical network 126. Devices 127, such as flight deck displays 128, flight control computers 130, and other components may be connected to optical network 126.

These other types of devices in devices 127 may take the form of line replaceable units, such as line replaceable units 132, 134, 136, 138, 140, 142, 144, 146, and 148. These line replaceable units may take various forms. For example, the line replaceable units may be a computer, a sensor, an in-flight entertainment system, and other suitable types of devices.

As depicted, some of devices 127 may use electrical signals instead of optical signals that are transmitted over optical network 126. These devices may be attached to and communicate with other devices in network data processing system 124 through the use of optical media converters. These optical media converters may include optical connectors and may be implemented in accordance with an illustrative embodiment.

Figure 2:
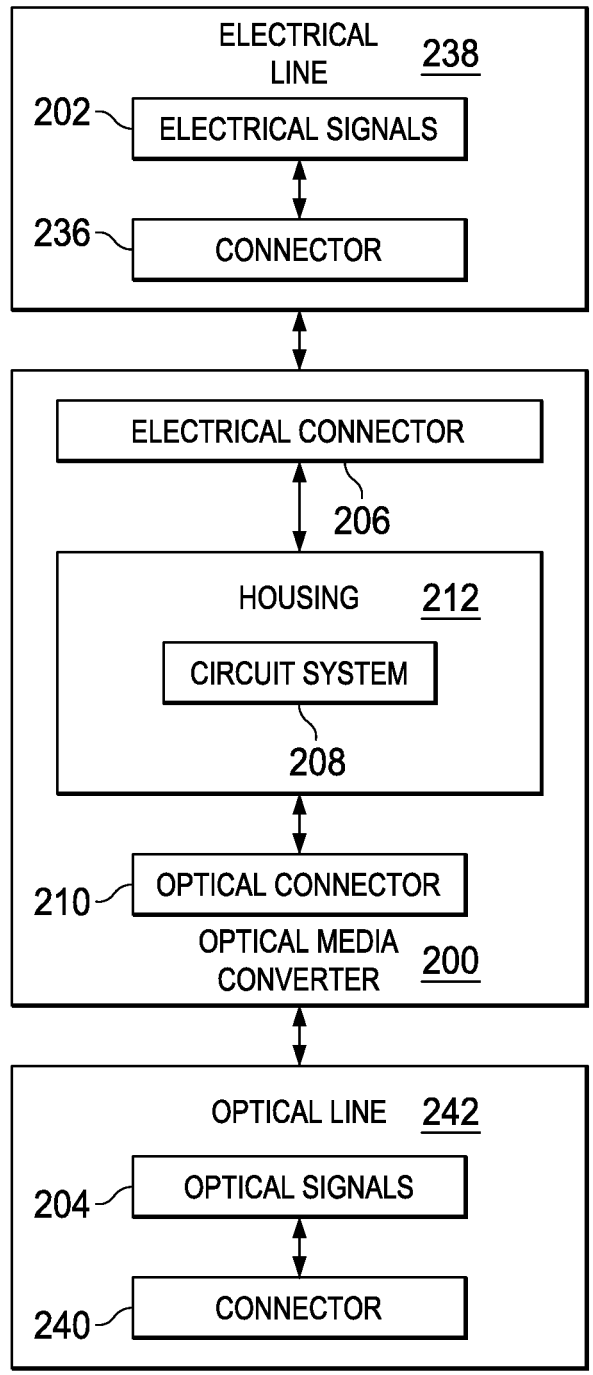
FIG. 2 is an illustration of a block diagram of an optical media converter in accordance with an illustrative embodiment.

Turning now to FIG. 2, an illustration of a block diagram of an optical media converter is depicted in accordance with an illustrative embodiment. In this depicted example, optical media converter 200 is an example of an optical media converter that may be used within network data processing system 124 to connect devices within devices 127 to optical network 126.

In particular, optical media converter 200 may be used to connect devices that communicate using electrical signals 202 to optical network 126. Optical media converter 200 is configured to convert electrical signals 202 into optical signals 204 and convert optical signals 204 into electrical signals 202.

In this illustrative example, optical media converter 200 comprises electrical connector 206, circuit system 208, and optical connector 210. Circuit system 208 may be located in housing 212. Electrical connector 206 and optical connector 210 are associated with housing 212.

In this illustrative example, electrical connector 206 is configured to be connected to connector 236 in electrical line 238. Electrical line 238 may have a number of electrical wires. Optical connector 210 is configured to be connected to connector 240 in optical line 242. Optical line 242 may have a number of optical fibers in these illustrative examples.

As depicted, optical connector 210 is configured to convert electrical signals 202 into optical signals 204. Additionally, optical connector 210 is configured to convert optical signals 204 into electrical signals 202.

In these illustrative examples, an illustrative embodiment may be implemented within optical connector 210. When implemented in accordance with an illustrative embodiment, optical connector 210 may provide a desired level of performance along with a desired size and weight for use in different platforms such as aircraft 102 in FIG. 1.

In this illustrative example, circuit system 208 is configured to condition electrical signals received at electrical connector 206, condition the returned electrical signal from optical connector 210, and then send the signal though electrical connector 206. For example, circuit system 208 may include circuits configured to condition electrical signals 202 for conversion into optical signals 204. This conditioning may include filtering, changing voltages, and other changes to electrical signals 202. Additionally, circuit system 208 may condition electrical signals 202 generated by the conversion of optical signals 204 from optical connector 210 into electrical signals 202.

Figure 3:
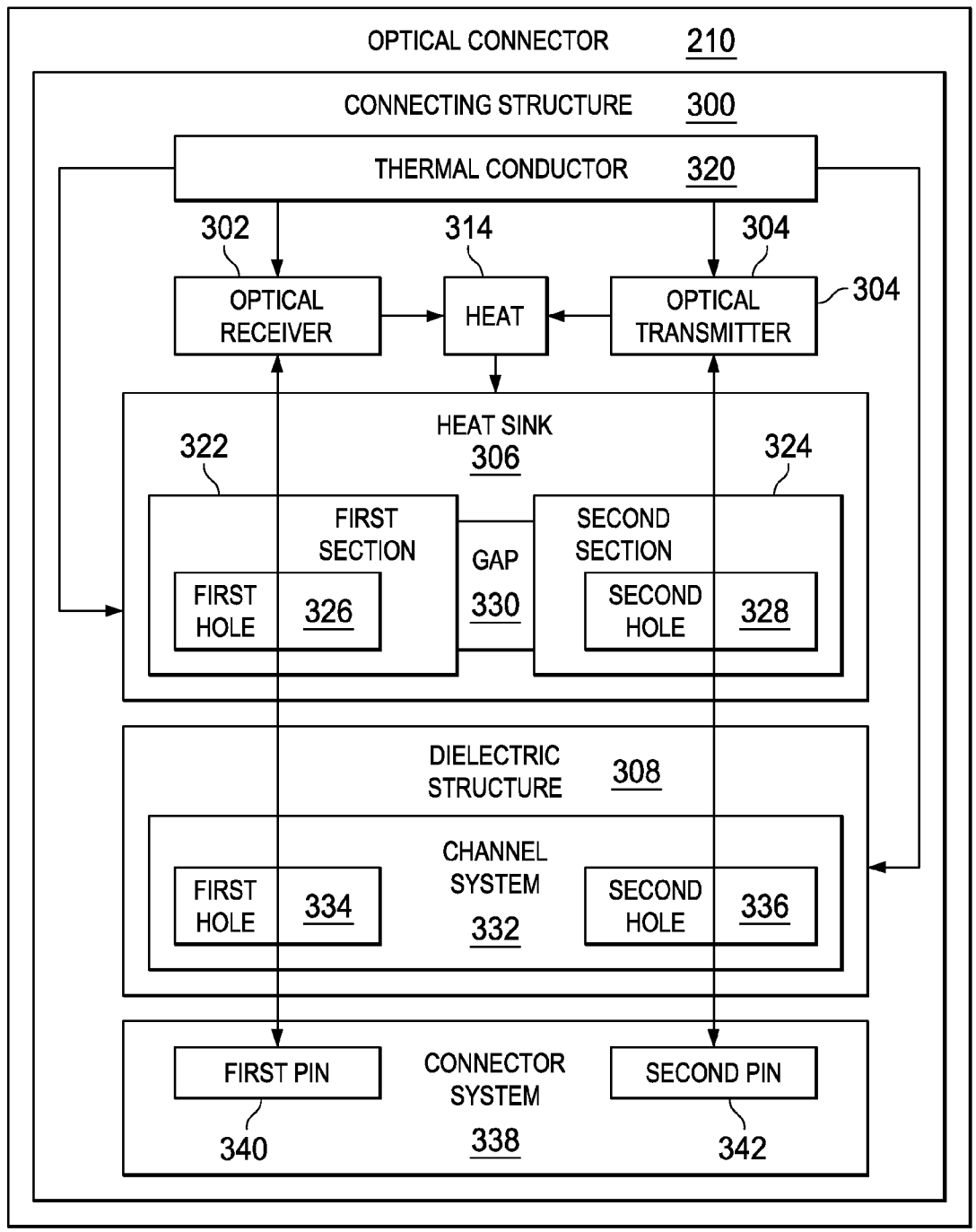
FIG. 3 is an illustration of a block diagram of an optical connector in accordance with an illustrative embodiment.

Turning now to FIG. 3, an illustration of a block diagram of an optical connector is depicted in accordance with an illustrative embodiment. In this illustrative example, examples of components that may be found in optical connector 210 in FIG. 2 are shown. As depicted, optical connector 210 comprises connecting structure 300, optical receiver 302, optical transmitter 304, heat sink 306, dielectric structure 308, and connector system 338.

Connecting structure 300 is configured to hold the different components of optical connector 210. In this illustrative example, connecting structure 300 may be comprised of a number of different materials. As used herein, a "number of" when used with reference to items means one or more items. For example, a number of materials is one or more materials.

For example, connecting structure 300 may be comprised of one or more materials selected from at least one of metal, polycarbonate, a composite material, aluminum, steel, titanium, and other suitable materials. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

In this illustrative example, optical receiver 302 is configured to receive optical signals 204 and convert optical signals 204 into electrical signals 202. Optical transmitter 304 is configured to convert electrical signals 202 into optical signals 204 in FIG. 2.

Heat sink 306 is associated with at least one of dielectric structure 308 and connecting structure 300. When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

As depicted, heat sink 306 is configured to conduct heat 314 that may be generated by at least one of optical receiver 302 and optical transmitter 304 away from optical receiver 302 and optical transmitter 304.

In this illustrative example, optical receiver 302 and optical transmitter 304 are connected to heat sink 306. In particular, optical receiver 302 and optical transmitter 304 may be mounted in heat sink 306.

In this illustrative example, optical receiver 302 and optical transmitter 304 may be connected to heat sink 306 through thermal conductor 320. Thermal conductor 320 may take various forms. For example, thermal conductor 320 may be selected from one of a thermal adhesive, an adhesive with aluminum nitride filling, an adhesive with boron nitride filling, and other suitable types of thermally conductive and electrically insulating materials.

In these illustrative examples, heat sink 306 may be thermally connected to the wall of connecting structure 300 to further conduct heat 314 from optical receiver 302 and optical transmitter 304 to the body of optical media converter 200 such that connecting structure 300 is integrated within optical media converter 200 in FIG. 2. Heat 314 from the body of optical media converter 200 is dissipated to a panel that is mounted on aircraft 102 in FIG. 1.

In this manner, heat sink 306 may thermally conduct heat 314 to connecting structure 300 but also may be electrically insulated from connecting structure 300 to allow the electronic circuitry of optical media converter 200 to operate on its own electrical ground level. This thermal conduction arrangement for heat sink 306 may result in optical receiver 302 and optical transmitter 304 meeting the reliability and operational requirements of a commercial aircraft environment.

In this illustrative example, heat sink 306 may take a number of different forms. In one illustrative embodiment, heat sink 306 may include first section 322 and second section 324. Optical receiver 302 may be mounted in first section 322 and optical transmitter 304 may be mounted in second section 324. In particular, optical receiver 302 may be mounted in first hole 326 in first section 322 and optical transmitter 304 may be mounted in second hole 328 in second section 324.

Further, in the configuration of heat sink 306, gap 330 may be present between first section 322 and second section 324. Gap 330 may be selected to reduce thermal cross-talk between first section 322 and second section 324. For example, heat 314 generated in first section 322 may not conduct into second section 324 with gap 330.

In these illustrative examples, gap 330 also may allow for the adjustment of the position of optical receiver 302 and optical transmitter 304 independently from each other. This adjustment may be made by adjusting the gap by adjusting the position of at least one of first section 322 and second section 324 in heat sink 306.

In this illustrative example, heat sink 306 may be comprised of a number of different materials. For example, heat sink 306 may be comprised of at least one of aluminum, copper, an aluminum alloy, copper-tungsten, a nickel-cobalt ferrous alloy, silicone-carbide in an aluminum matrix, dymalloy, and other suitable materials that may provide a desired level of thermal conductivity for heat 314 that may be generated by at least one of optical receiver 302 and optical transmitter 304.

Heat sink 306 may be connected to dielectric structure 308 using thermal conductor 320. Thermal conductor 320 also may aide in conducting heat 314 away from at least one of optical receiver 302 and optical transmitter 304. In some illustrative examples, thermal conductor 320 may be an adhesive. The adhesive may be an epoxy that is thermally conductive in this illustrative example.

In these illustrative examples, dielectric structure 308 is configured to hold heat sink 306 with optical receiver 302 and optical transmitter 304. In this illustrative example, dielectric structure 308 is configured to be associated with the interior of connecting structure 300. In particular, dielectric structure 308 may be associated with connecting structure 300 using at least one of an interference fit, thermal conductor 320, an adhesive, and other suitable components.

In this illustrative example, dielectric structure 308 has channel system 332. Channel system 332 is configured to receive optical receiver 302 and optical transmitter 304. In particular, channel system 332 may include first hole 334 and second hole 336. First hole 334 is configured to receive optical receiver 302 and second hole 336 is configured to receive optical transmitter 304.

In particular, the ability to adjust the position of optical receiver 302 and optical transmitter 304 relative to each other in first section 322 and second section 324 may allow for a more precise placement of these components within channel system 332 in dielectric structure 308. For example, the placement of first section 322 and second section 324 may be adjusted such that optical receiver 302 is positioned in first hole 334 and optical transmitter 304 is positioned in second hole 336. The positioning of optical receiver 302 and optical transmitter 304 may provide a desired optical coupling position in these illustrative examples.

Dielectric structure 308 may be comprised of a number of different materials. For example, dielectric structure 308 may be comprised of at least one of thermal plastic, thermally conducting polyphenylene sulfide, machinable alumina, aluminum nitride, and other suitable types of materials.

In these illustrative examples, connector system 338 is configured to connect optical receiver 302 and optical transmitter 304 to connector 240 in optical line 242 in FIG. 2. In this illustrative example, the connection is an optical connection that may also include a physical connection.

In one illustrative example, connector system 338 comprises first pin 340 and second pin 342. First pin 340 may connect optical receiver 302 to an optical fiber in optical line 242. Second pin 342 may connect optical transmitter 304 to an optical fiber in optical line 242. In these illustrative examples, first pin 340 may be located in first hole 334 and second pin 342 may be located in second hole 336 in channel system 332 of dielectric structure 308.

Connector system 338 may be connected to an optical fiber. For example, connector system may be configured to be connected to a plastic optical fiber or a glass optical fiber.

The illustration of optical media converter 200 in FIG. 2 and optical connector 210 in FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, optical connector 210 may include one or more optical receivers in addition to optical receiver 302. Further, one or more optical transmitters in addition to optical transmitter 304 also may be present.

In other illustrative examples, dielectric structure 308 may be omitted. In yet other illustrative examples, heat sink 306 may be mounted on a surface of dielectric structure 308 instead of within channel system 332.

In yet other illustrative examples, some of the components illustrated as being located in optical connector 210 may be partially or entirely located within housing 212. For example, at least one of optical receiver 302 and optical transmitter 304 may be located partially or entirely within housing 212 in some illustrative examples.

Figure 4:
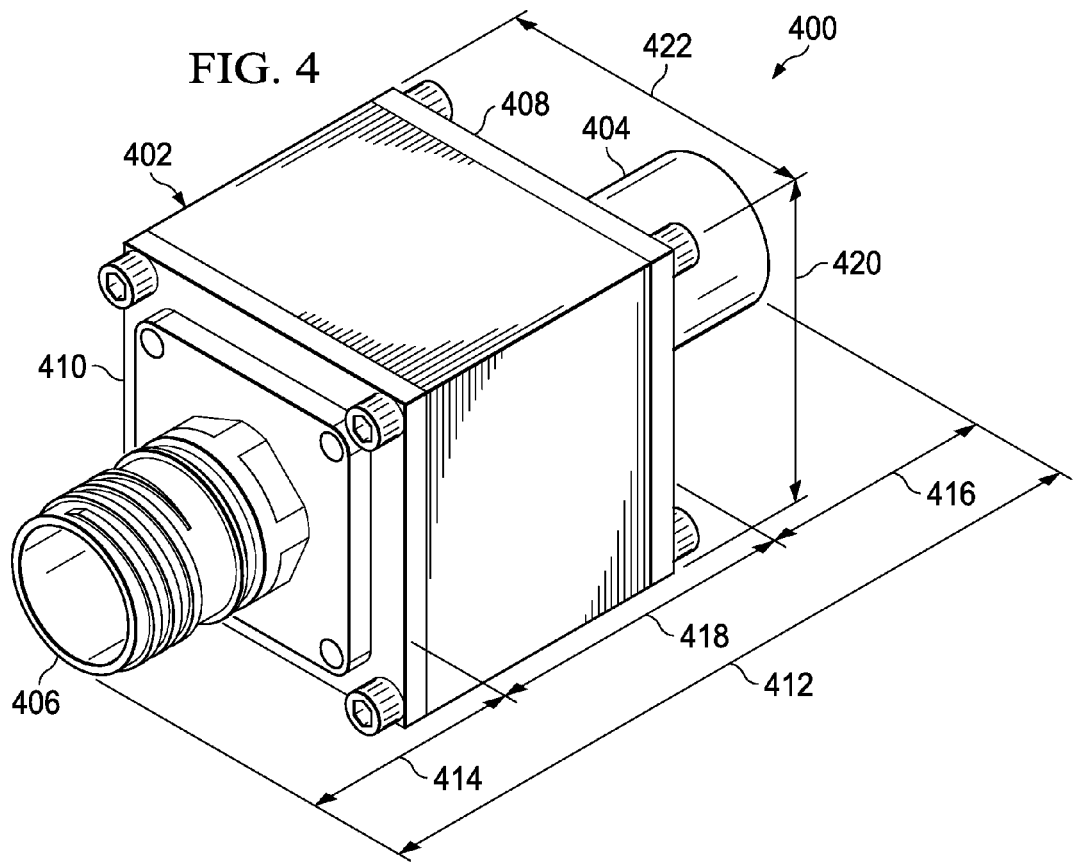
FIG. 4 is an illustration of a media converter with an optical connector in accordance with an illustrative embodiment.

Turning now to FIG. 4, an illustration of a media converter with an optical connector is depicted in accordance with an illustrative embodiment. In this illustrative example, optical media converter 400 is an example of one physical implementation for optical media converter 200 shown in block form in FIG. 2. Optical media converter 400 may be used to provide connections between one or more of devices 127 in network data processing system 124 that use electrical signals rather than optical signals.

In this illustrative example, optical media converter 400 has housing 402. Housing 402 has the shape of a cuboid in this illustrative example.

As depicted, electrical connector 404 and optical connector 406 are associated with housing 402. In this illustrative example, electrical connector 404 is located on first side 408 of housing 402. Optical connector 406 is located on second side 410 of housing 402. In this illustrative example, first side 408 is opposite of second side 410 on housing 402.

Electrical connector 404 is configured to be connected to a device that uses electrical signals. Optical connector 406 is configured to be connected to an optical network in these illustrative examples. Of course, optical connector 406 may be connected directly to another device depending on the particular implementation.

When implemented in accordance with an illustrative embodiment, optical media converter 400 may have a desired size. In this illustrative example, optical media converter 400 has length 412. Length 412 may be, for example, about 2.5 inches. Optical connector 406 has length 414 and electrical connector 404 has length 416. Length 414 may be about 0.75 inches, and length 416 may be about 0.75 inches. Housing 402 has length 418, height 420, and depth 422. Length 418 is about 1 inch, height 420 is about 1 inch, and depth 422 is about 1.25 inches.

Figure 5:
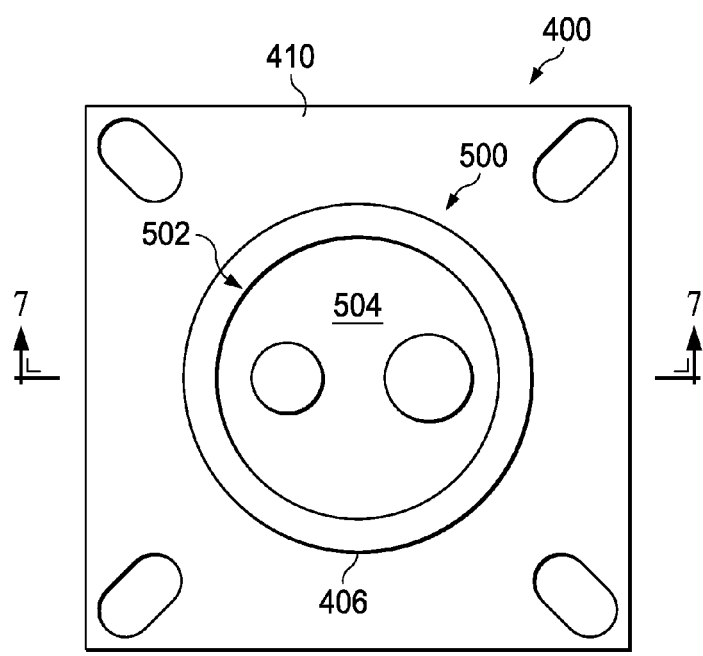
FIG. 5 is an illustration of an end view of an optical connector in accordance with an illustrative embodiment.

Turning now to FIG. 5, an illustration of an end view of an optical connector is depicted in accordance with an illustrative embodiment. In this example, an end view of optical media converter 400 is seen from second side 410 in FIG. 4.

In this illustrative example, connecting structure 500 for optical connector 406 has channel 502. Also seen in this view is dielectric structure 504 for optical connector 406. Connecting structure 500 is an example of a physical implementation for connecting structure 300 in FIG. 3. Dielectric structure 504 is also a physical implementation for dielectric structure 308 in FIG. 3.

Figure 6:
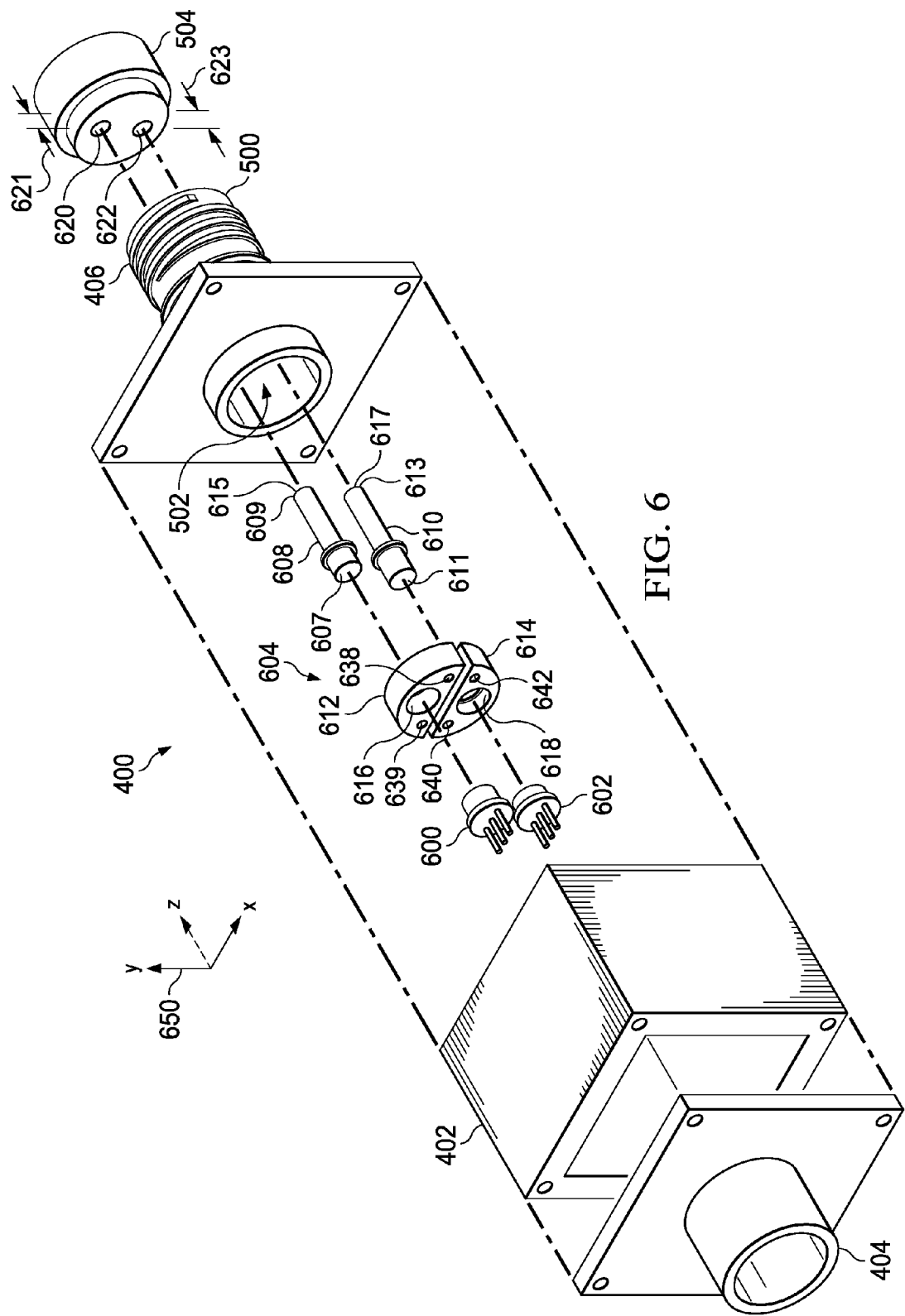
FIG. 6 is an illustration of an exploded view of an optical connector in accordance with an illustrative embodiment.

Turning now to FIG. 6, an illustration of an exploded view of an optical connector is depicted in accordance with an illustrative embodiment. In this view, additional components for optical media converter 400 are shown.

In this exploded view, components within housing 402 such as optical receiver 600, optical transmitter 602, heat sink 604, dielectric structure 504, first pin 608, and second pin 610 can be seen.

Optical receiver 600 is an example of one physical implementation for optical receiver 302 shown in block form in FIG. 3. Optical transmitter 602 is an example of a physical implementation for optical transmitter 304 in FIG. 3. Heat sink 604 is an example of one manner in which heat sink 306 shown in block form in FIG. 3 may be implemented.

In this illustrative example, heat sink 604 is comprised of first section 612 and second section 614. These two sections are separate pieces in this illustrative example.

As depicted, hole 616 in first section 612 is configured to receive optical receiver 600. Hole 618 in second section 614 is configured to receive optical transmitter 602. Hole 638, hole 639, hole 640, and hole 642 are configured to facilitate the use of alignment tools for horizontal position adjustment. For example, alignment tools inserted into one of hole 638, hole 639, hole 640, and hole 642 may move heat sink 604 along the surface of dielectric structure 504. This movement may be movement along x-y-z plane 650 in these illustrative examples.

In these illustrative examples, 638, hole 639, hole 640, and hole 642 may be filled with an epoxy to strengthen the attachment of heat sink 604 to dielectric structure 504. The addition of epoxy may be made during attachment of heat sink 604 to dielectric structure 504. In these illustrative examples, the epoxy may be a high temperature epoxy. This high temperature epoxy may be an adhesive configured for use at a temperature in excess of about 100 degrees Celsius.

In these illustrative examples, first pin 608 and second pin 610 are examples of physical implementations for first pin 340 and second pin 342 within connector system 338 in FIG. 3. First pin 608 is configured to be connected to optical receiver 600. Second pin 610 is configured to be connected to optical transmitter 602. These connections are ones that allow for reception of optical signal by optical receiver 600 in first pin 608 and transmission of optical signal from optical transmitter 602 in second pin 610.

In these illustrative examples, first pin 608 has an optical fiber that runs from a first end 607 of first pin 608 to a second end 609 of first pin 608. Similarly, second pin 610 has an optical fiber that runs from a first end 611 of second pin 610 to a second end 613 of second pin 610. Further, first pin 608 is polished at first end 607 and second end 609. Second pin 610 is polished at first end 611 and second end 613.

As depicted, second end 609 of first pin 608 may have recess 615. Second end 613 of second pin 610 also may have recess 617. In these illustrative examples, recess 615 and recess 617 may be present after polishing to prevent scratching when mated with other plastic optical fibers.

When first pin 608 and second pin 610 are polished, the optical fiber associated with each pin may also be polished. Because the optical fibers are made of a softer material than first pin 608 and second pin 610, the optical fibers will be polished more than first pin 608 and second pin 610. As a result, recess 615 and recess 617 are formed.

In some illustrative examples, recess 615 and recess 617 may be a depth of about 20 microns. The diameter of recess 615 and 617 may be substantially the same as the first pin 608 and second pin 610, respectively. Of course, recess 615 and recess 617 may have a different depth, depending on the particular implementation.

As can be seen in this illustrative example, dielectric structure 504 is configured to fit within channel 502 in connecting structure 500. Additionally, dielectric structure 504 is configured to receive first pin 608 and optical receiver 600 in hole 620. Additionally, dielectric structure 504 is configured to receive second pin 610 and optical transmitter 602 in hole 622. Additionally, heat sink 604 is configured to contact dielectric structure 504 within channel 502 of connecting structure 500 in these illustrative examples.

The illustration of different components for optical media converter 400 as shown in FIGS. 4-6 are not meant to imply physical or architectural limitations to the manner in which an illustrative embodiment may be implemented. For example, in some implementations, one or more additional optical receivers and transmitters may be present in optical media converter 400. Additionally, in some depicted examples, heat sink 306 in FIG. 3 may be a single piece rather than two pieces.

Figure 7:
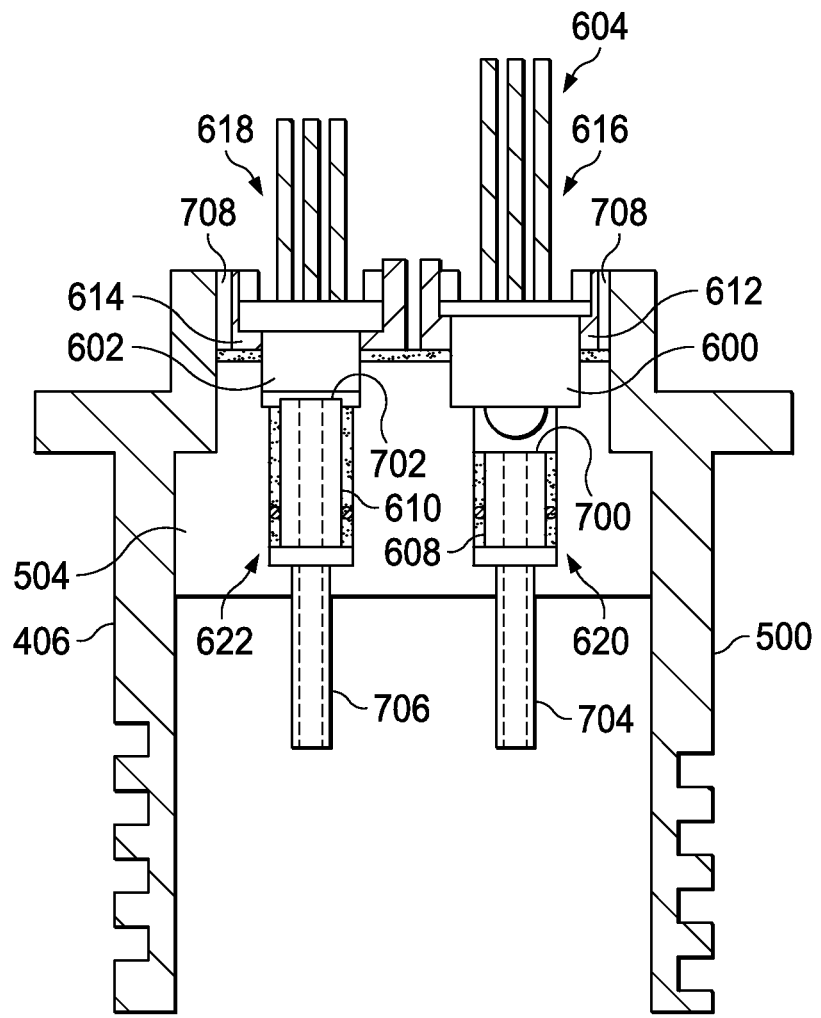
FIG. 7 is an illustration of a cross-sectional view of an optical connector in accordance with an illustrative embodiment.

Turning now to FIG. 7, an illustration of a cross-sectional view of an optical connector is depicted in accordance with an illustrative embodiment. Optical media converter 400 is shown in a cross-sectional view taken along lines 7-7 in FIG. 5.

In this illustrative example, end 700 of first pin 608 is coupled to optical receiver 600. This contact is configured to allow for the coupling of optical signals received through first pin 608 to optical receiver 600. In a similar fashion, end 702 of second pin 610 is coupled to optical transmitter 602. This contact is configured such that optical signals generated by optical transmitter 602 are sent through second pin 610. In this illustrative example, end 704 of first pin 608 is configured to be connected to an optical fiber. In a similar fashion, end 706 of second pin 610 also is configured to be connected to an optical fiber.

In the illustrative embodiments, heat sink 604 is located on dielectric structure 504. Heat sink 604 is connected to at least one of dielectric structure 504 and connecting structure 500 by thermal conductor 708. In this illustrative example, thermal conductor 708 takes the form of a thermal epoxy that has a desired level of thermal conductivity and electrical insulation.

As can be seen, optical receiver 600 is configured to be received by heat sink 604 and dielectric structure 504. In a similar fashion, optical transmitter 602 is also configured to be received by heat sink 604 and dielectric structure 504. Optical receiver 600 and optical transmitter 602 are in thermal contact with heat sink 604. In this illustrative example, thermal contact is made directly by a thermal epoxy.

Turning now to FIGS. 8-16, illustrations of a process used to manufacture an optical connector is depicted in accordance with an illustrative embodiment. In this illustrative example, these different figures illustrate one manner in which optical media converter 400 may be manufactured. The different views in these figures are cross-sectional views of the assembly of components in optical media converter 400 taken along lines 7-7 in FIG. 5.

Figure 8:
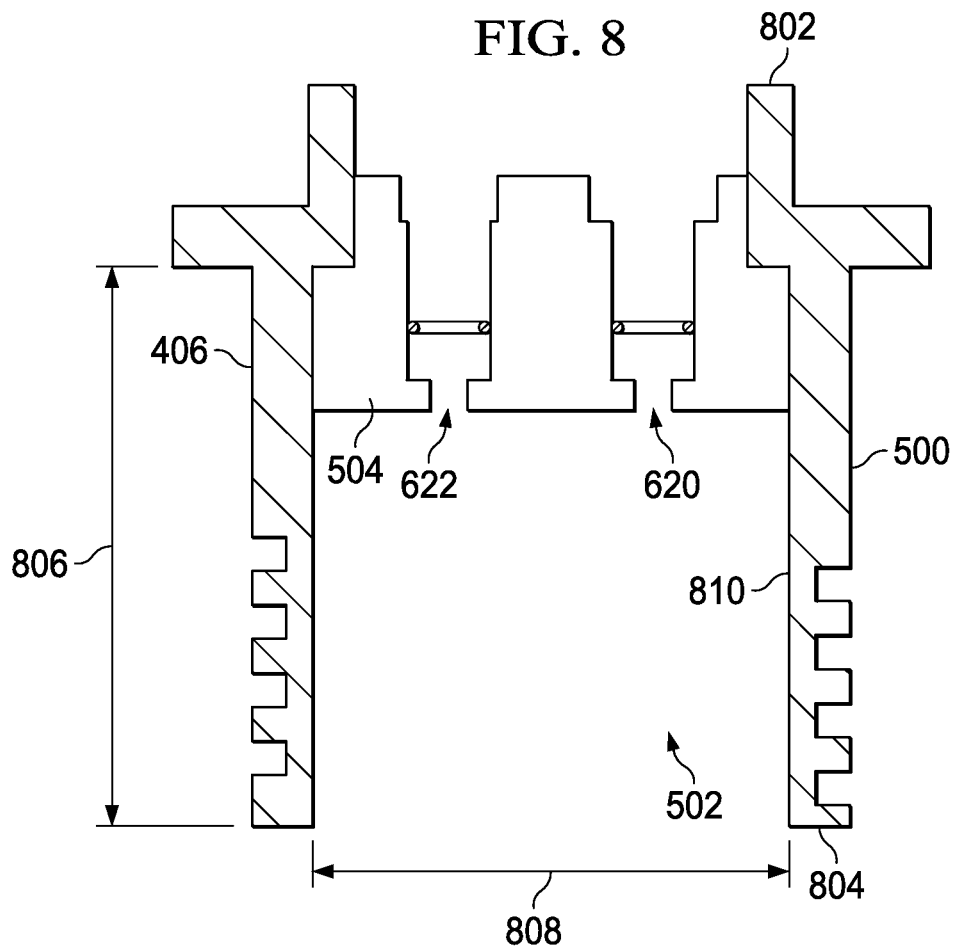
FIGS. 8-16 are illustrations of a process used to manufacture an optical connector in accordance with an illustrative embodiment.

Turning now to FIG. 8, an illustration of an optical connector with a dielectric structure is depicted in accordance with an illustrative embodiment. In this depicted example, dielectric structure 504 is placed into channel 502 of connecting structure 500.

In this illustrative example, hole 620 and hole 622 of dielectric structure 504 are formed with dimensions such that optical receiver 600 and optical transmitter 602 in FIG. 6 fit into hole 620 and hole 622 at desired vertical distance 621 and desired vertical distance 623 in FIG. 6, respectively.

As depicted, desired vertical distance 621 may be the vertical distance from the receiving plastic optical fiber to optical receiver 600. Desired vertical distance 623 is the vertical distance from the transmitting plastic optical fiber to optical transmitter 602. For example, desired vertical distance 621 may be selected to have a value that provides a desired level of coupling of the plastic optical fiber to optical receiver 600. Further, desired vertical distance 623 may selected to have a value that provides a desired level of coupling of the optical signal from optical transmitter 602 to the plastic optical fiber. In other words, desired vertical distance 621 and desired vertical distance 623 may be configured such that desired vertical distance 621 and desired vertical distance 623 provide a desired level of transmission of optical signals to optical receiver 600 and optical transmitter 602, respectively.

Connecting structure 500 has end 802 and end 804. In this illustrative example, connecting structure 500 takes the form of a metal shell or a metal cylindrical structure. Dielectric structure 504 takes the form of a dielectric insert that may be placed into channel 502 of connecting structure 500 through end 804 of connecting structure 500.

In this illustrative example, channel 502 of connecting structure 500 may have length 806. In this illustrative example, length 806 is about 0.8 inches. Additionally, channel 502 of optical connector 406 may have diameter 808. Diameter 808 may be about 0.88 inches.

In this illustrative example, dielectric structure 504 is connected to wall 810 in channel 502 of connecting structure 500. This connection may be made in a number of different ways. For example, the connection may be an interference fit, an adhesive, an epoxy, or some other suitable mechanism.

Figure 9:
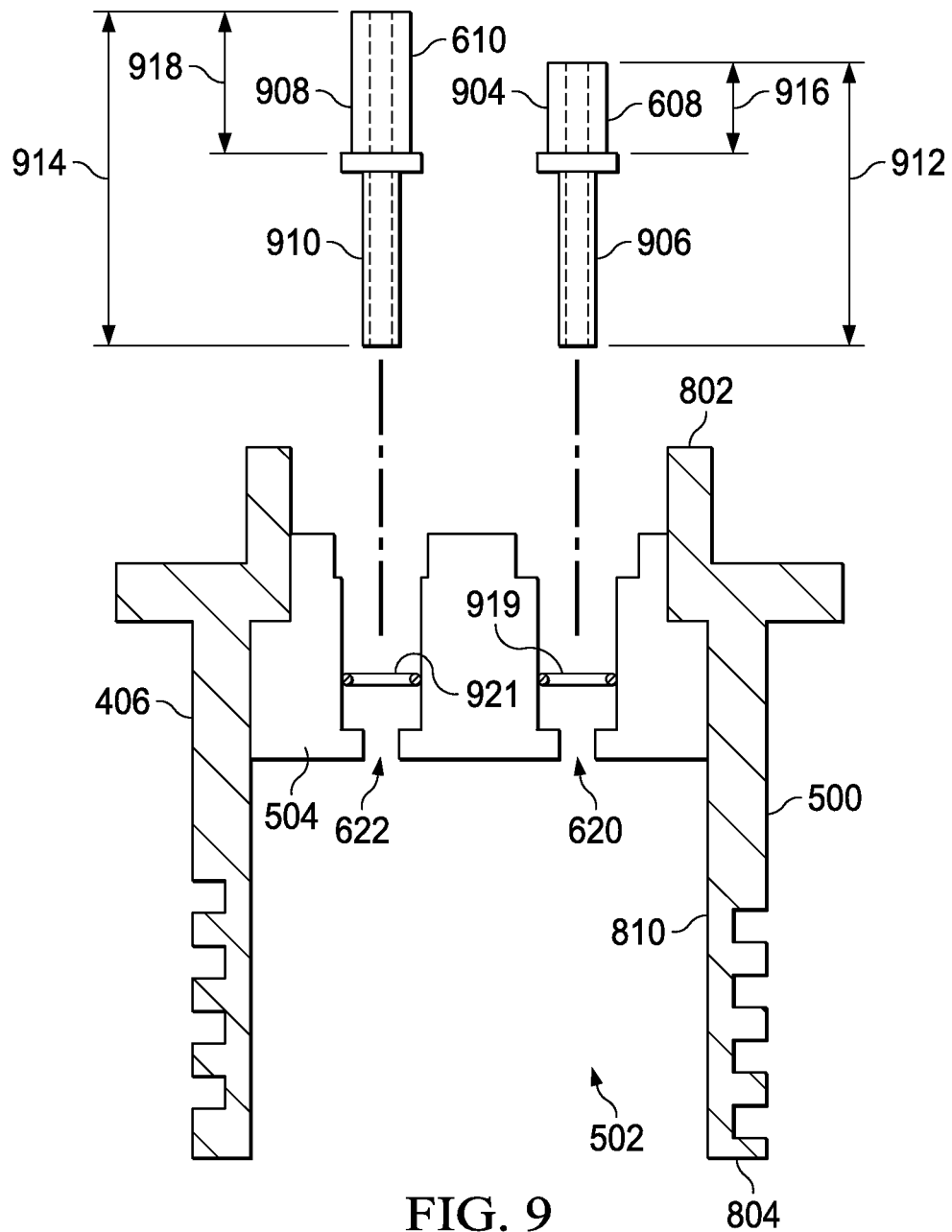

Turning now to FIG. 9, an illustration of the position of pins to an optical connector is depicted in accordance with an illustrative embodiment. In this illustrative example, first pin 608 and second pin 610 are positioned relative to hole 620 and hole 622 in dielectric structure 504. First pin 608 and second pin 610 may be placed into dielectric structure 504. In particular, first pin 608 may be placed into hole 620 while second pin 610 may be placed into hole 622.

In these illustrative examples, first pin 608 includes terminus 904 and plastic optical fiber 906. Second pin 610 includes terminus 908 and plastic optical fiber 910. A terminus is a structure for a plastic optical fiber that is configured to be optically coupled to another terminus, an optical fiber, a pin, or some other medium that carries optical signals. When terminus 904 and terminus 908 are used, an optical signal may be transmitted by plastic optical fiber 906 and plastic optical fiber 910, respectively.

Further, first pin 608 has length 912 and second pin 610 has length 914. In these illustrative examples, length 912 and length 914 are selected to take into account the length of connecting structure 500 and the desired plastic optical fiber coupling distances of optical receiver 600 and optical transmitter 602 in FIG. 6. In particular, length 916 of terminus 904 may be shorter than length 918 of terminus 908 to take into account different desired optical coupling distances between optical receiver 600 and optical transmitter 602.

In these illustrative examples, terminus 904 and terminus 908 may be configured to couple light signals to optical receiver 600 and couple output optical signals from optical transmitter 602 from FIG. 6, respectively. These terminus 904, terminus 908, first pin 608, and second pin 610 may be implemented using, for example, without limitation, stainless steel tubes.

Additionally, retaining structure 919 and retaining structure 921 are present in these illustrative examples, retaining structure 919 is located within hole 620 and retaining structure 921 is located within hole 622. Retaining structure 919 and retaining structure 921 are mechanical structures. Retaining structure 919 is configured to hold terminus 904 at a desired depth in hole 620 and retaining structure 921 is configured to hold terminus 908 at a desired depth in hole 622.

In these illustrative examples, retaining structure 919 and retaining structure 921 are shown in the form of a ring. Of course, retaining structure 919 and retaining structure 921 may be any shape that is configured to be used in hole 620 and hole 622, respectively. Further, retaining structure 919 and retaining structure 921 may be comprised of any type of material configured to hold terminus 904 and terminus 908 at a desired depth in hole 620 and hole 622, respectively.

Figure 10:
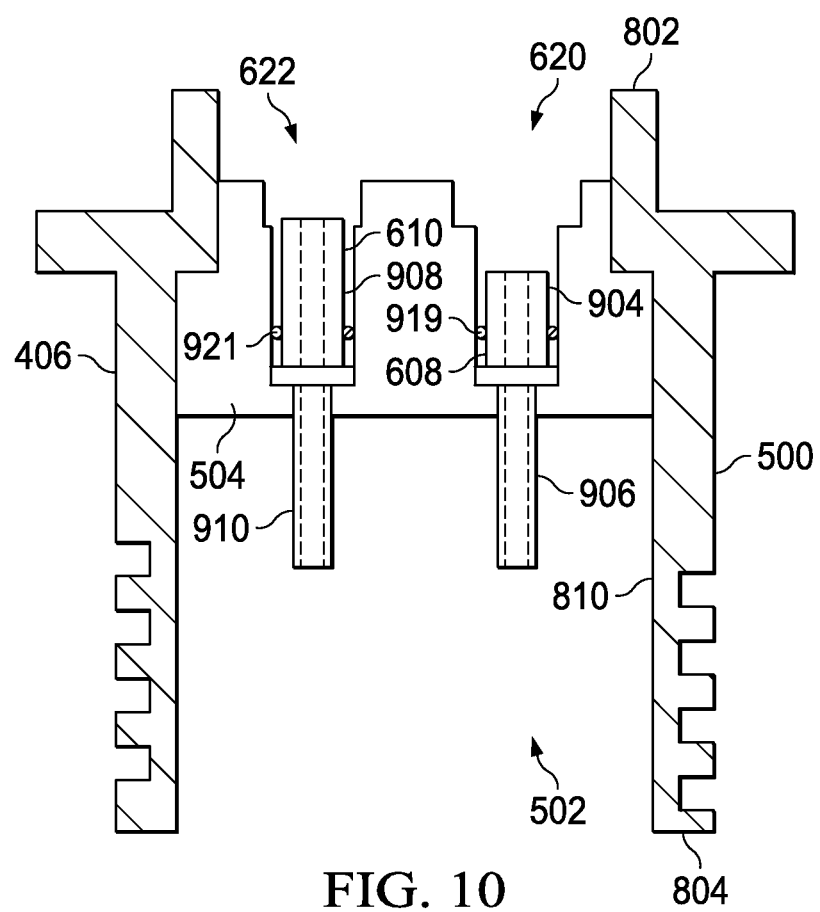

Turning now to FIG. 10, an illustration of pins inserted into an optical connector is depicted in accordance with an illustrative embodiment. Adjustments to the position of first pin 608 in hole 620 and second pin 610 in hole 622 may be made.

In this illustrative example, first pin 608 and second pin 610 are shown installed within hole 620 and hole 622 of dielectric structure 504, respectively. As can be seen, hole 620 and hole 622 are still configured to receive optical receiver 600 and optical transmitter 602 from FIG. 6, respectively. This installation of optical receiver 600 and optical transmitter 602 is described in more detail below.

Figure 11:
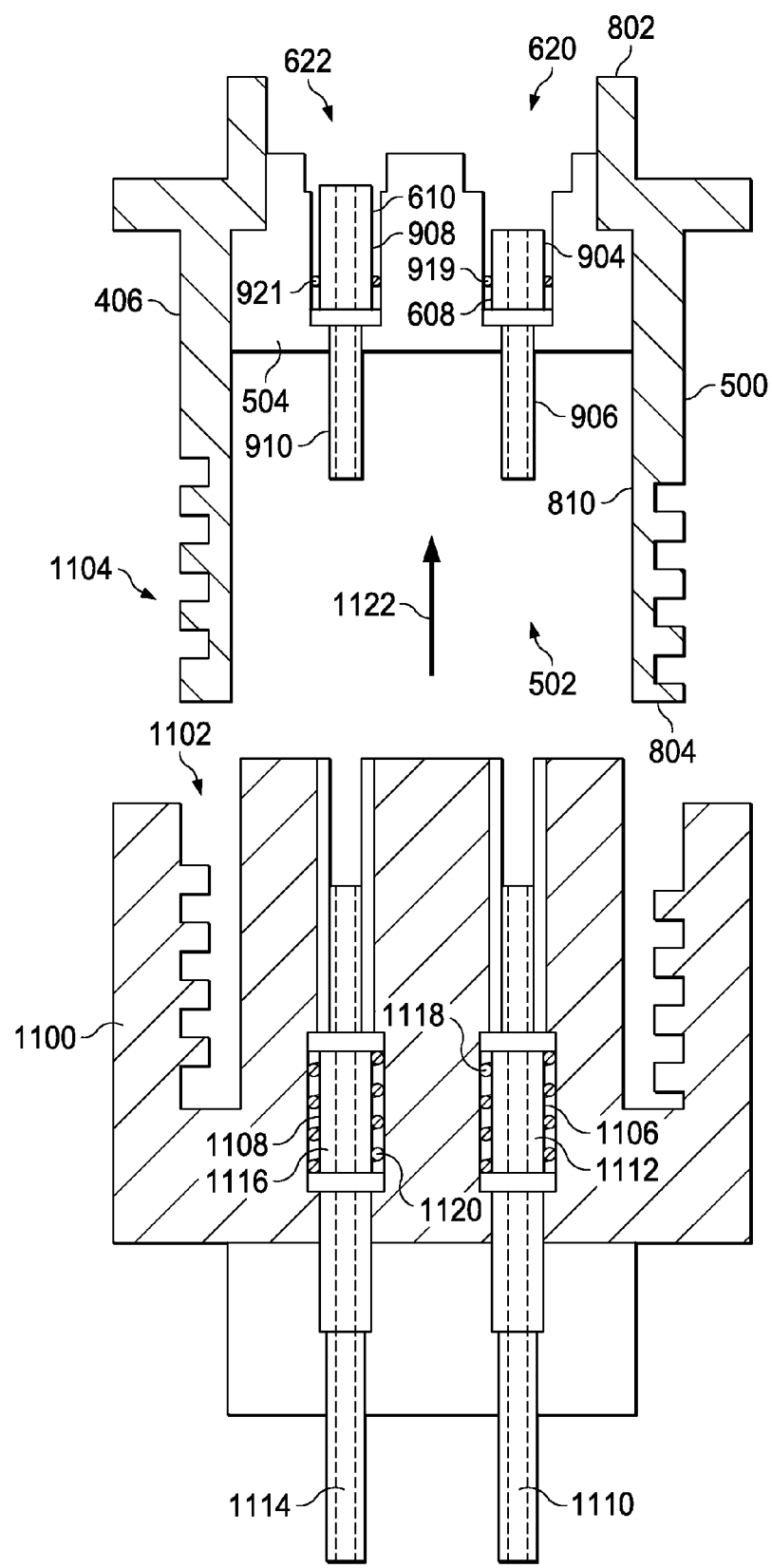

Turning now to FIG. 11, an illustration of a connector for an optical line configured to engage an optical connector is depicted in accordance with an illustrative embodiment. In this depicted example, connector 1100 is an example of one physical implementation for connector 240 for optical line 242 shown in block form in FIG. 2.

In this illustrative example, connector 1100 may be configured for use in positioning first pin 608 within hole 620 and second pin 610 within hole 622. As depicted, connector 1100 has engagement section 1102 that is configured to engage engagement section 1104 of connecting structure 500. In this illustrative example, connector 1100 includes first terminator 1106 and second terminator 1108. First terminator 1106 is comprised of plastic optical fiber 1110 and housing 1112. Second terminator 1108 is comprised of plastic optical fiber 1114 and housing 1116.

In these illustrative examples, housing 1112 includes spring 1118 and housing 1116 includes spring 1120. Housing 1112 is configured to move plastic optical fiber 1110 in the direction of arrow 1122. Housing 1116 is configured to move plastic optical fiber 1114 in the direction of arrow 1122.

As depicted, spring 1118 is configured to apply a force to move plastic optical fiber 1110 in the direction of arrow 1122. In particular, spring 1118 may be configured to move a portion of housing 1112 to move plastic optical fiber 1110.

For example, spring 1118 may be configured to apply force to an inner portion of housing 1112 that holds plastic optical fiber 1110 while an outer portion is fixed. In a similar fashion, spring 1120 in housing 1116 is configured to move plastic optical fiber 1114 in the direction of arrow 1122.

Figure 12:
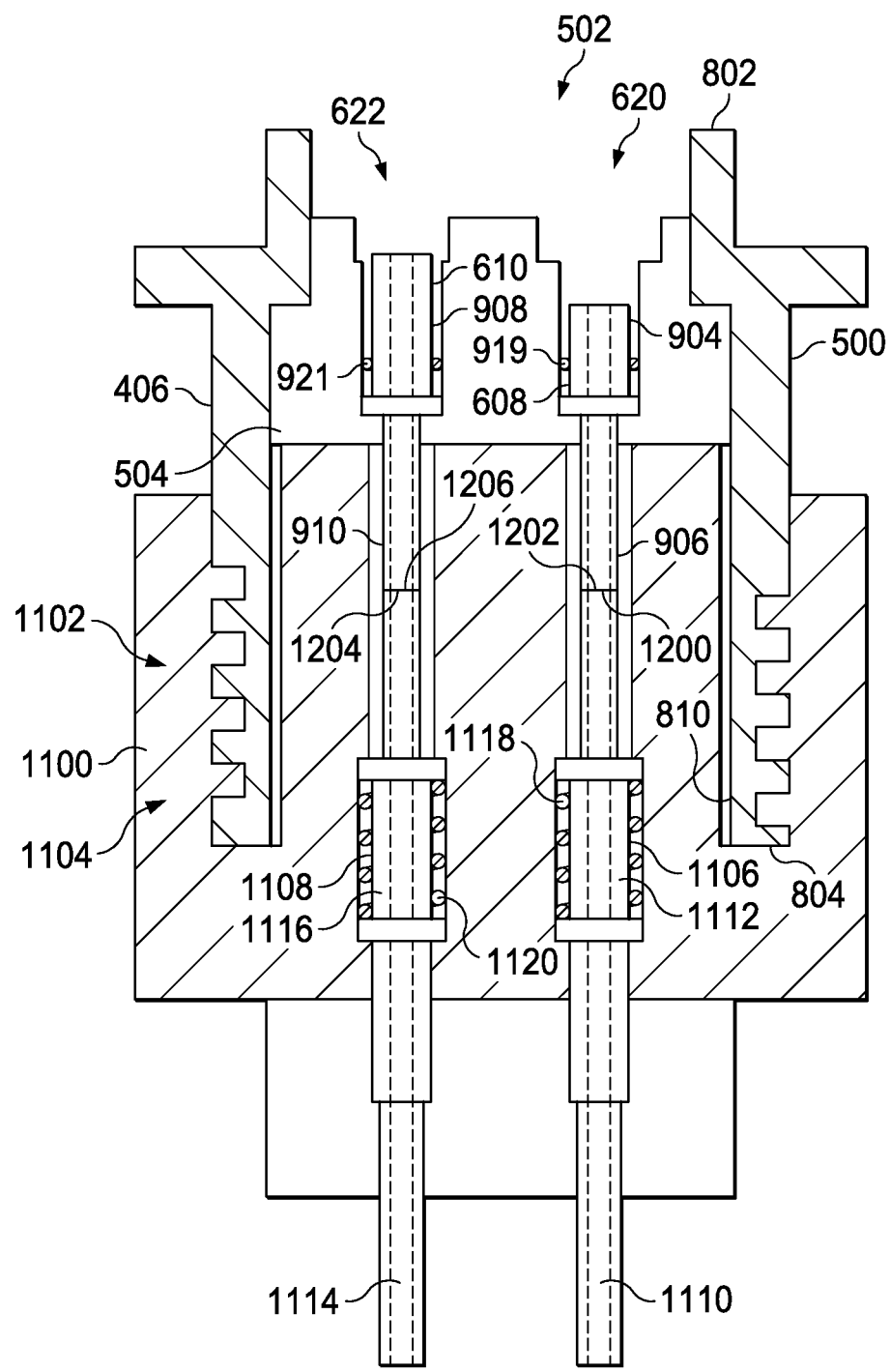

Turning now to FIG. 12, connector 1100 is shown as being engaged with connecting structure 500. As can be seen in this illustrative example, end 1200 of plastic optical fiber 1110 is shown as being biased against end 1202 of plastic optical fiber 906.

When end 1200 of plastic optical fiber 1110 is biased against end 1202 of plastic optical fiber 906, plastic optical fiber 1110 is coupled with plastic optical fiber 906. In this manner, plastic optical fiber 1110 in first terminator 1106 may bias plastic optical fiber 906 such that first pin 608 may be in a desired vertical position within hole 620 in dielectric structure 504.

In these illustrative examples, end 1204 of plastic optical fiber 1114 is shown as being biased against end 1206 of plastic optical fiber 910. In a similar fashion, plastic optical fiber 1114 may bias second pin 610 into a desired vertical position within hole 622 in dielectric structure 504.

Figure 13:
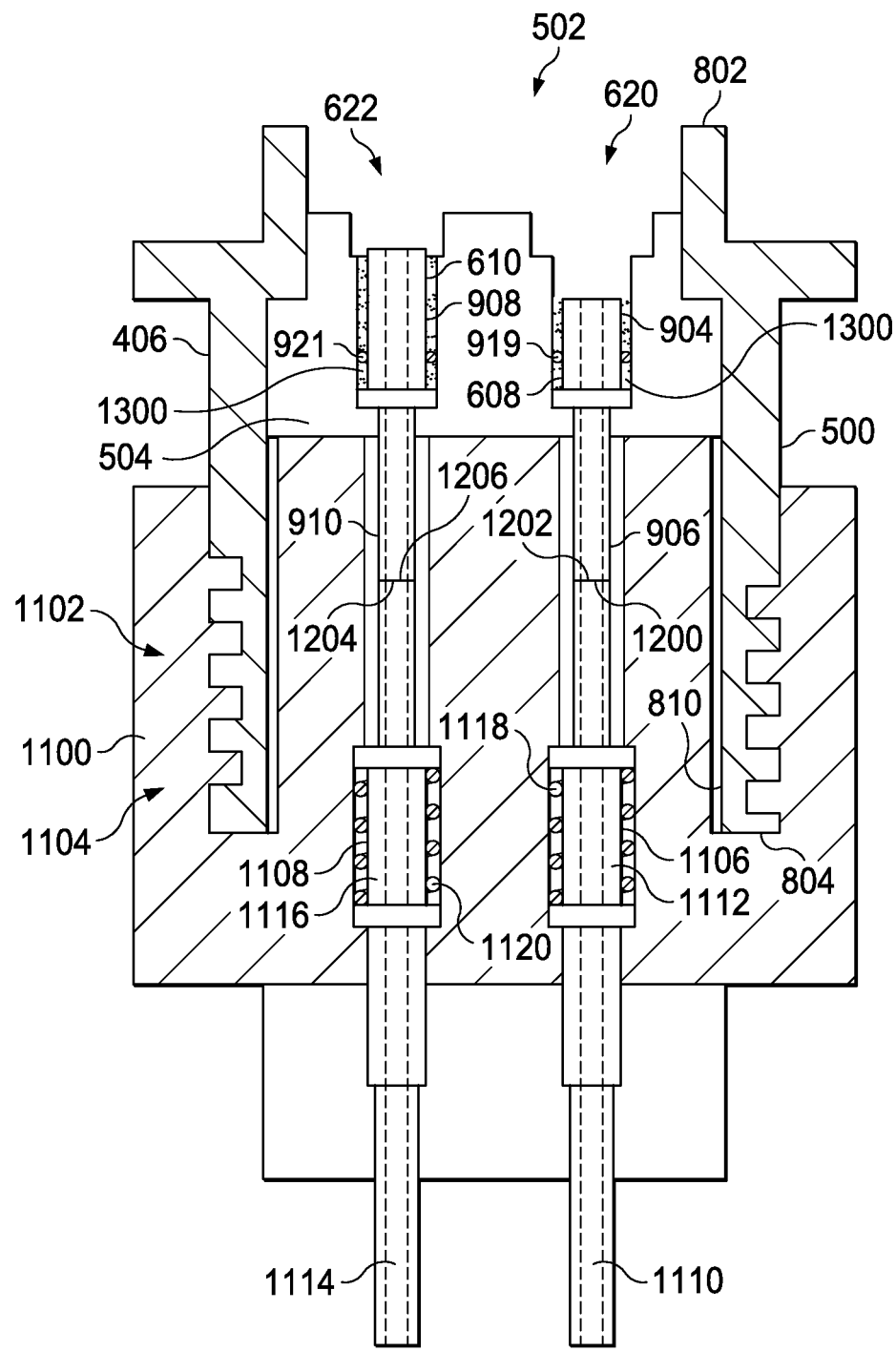

Turning now to FIG. 13, an illustration of an adhesive applied to a connector is depicted in accordance with an illustrative embodiment. In this depicted example, adhesive 1300 is applied into terminus 904 in first pin 608 and terminus 908 in second pin 610. Adhesive 1300 may be, for example, an epoxy. Adhesive 1300 may hold first pin 608 and second pin 610 in a desired position within hole 620 and hole 622, respectively.

With the application of adhesive 1300, adhesive 1300 may be cured. In this illustrative example, optical connector 406 and connector 1100 may be placed into an oven. The oven may heat adhesive 1300 to about 100 degrees Celsius for about three hours in one illustrative example. Of course, other types of epoxy or adhesives may use different curing temperatures and times depending on the particular implementation.

Figure 14:
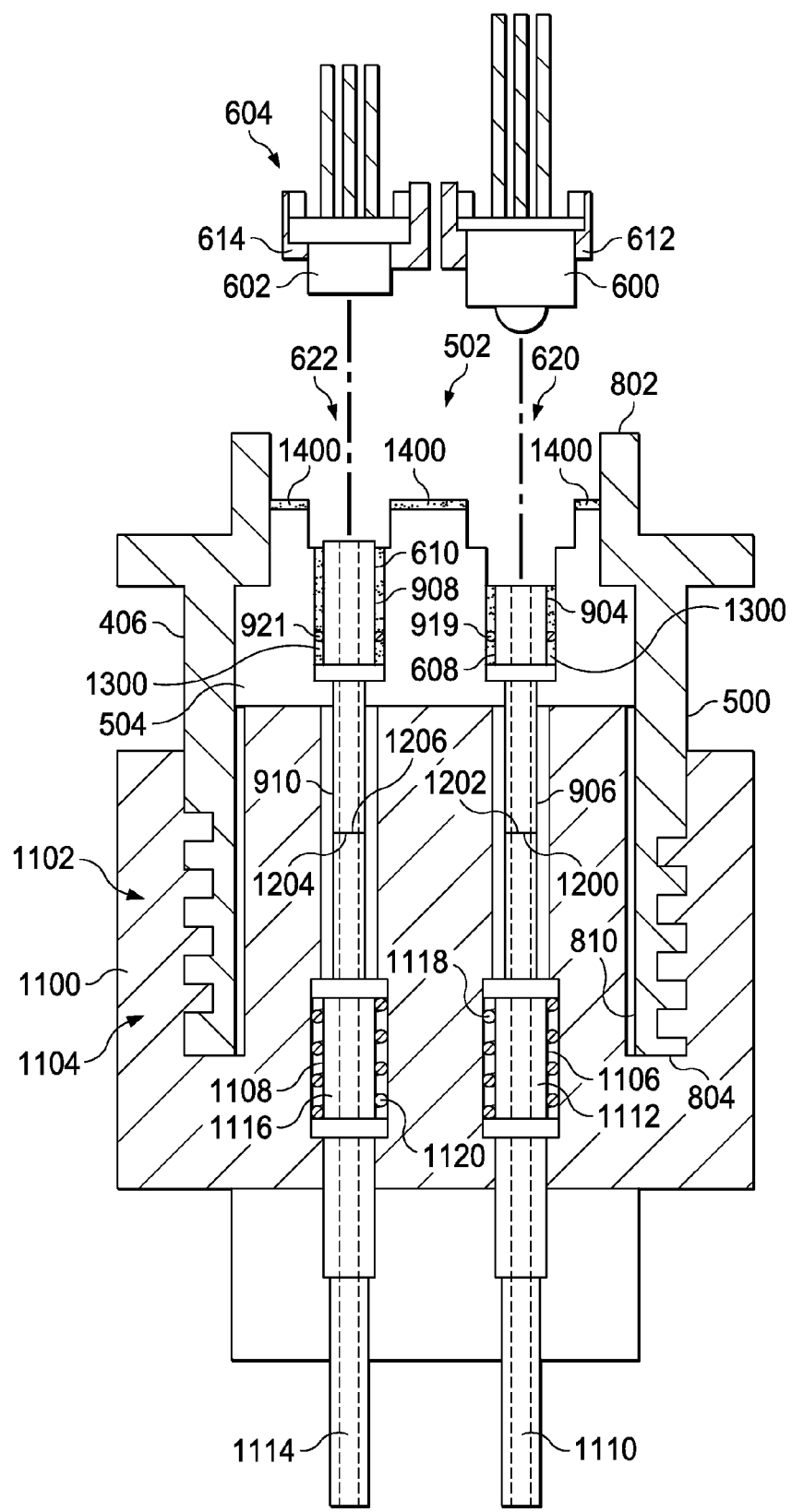

Turning now to FIG. 14, an illustration of an optical receiver and an optical transmitter positioned relative to a connecting structure is depicted in accordance with an illustrative embodiment. As depicted, optical receiver 600 and optical transmitter 602 are shown as installed on heat sink 604.

Optical receiver 600 and optical transmitter 602 may be connected to heat sink 604 in a number of different ways. For example, optical receiver 600 and optical transmitter 602 may be connected to heat sink 604 using a material such as a thermal conductor, an adhesive, or some other suitable material.

In this case, a layer of adhesive 1400 may be added to the surface of dielectric structure 504. Adhesive 1400 may be a high strength adhesive in these illustrative examples. Adhesive 1400 may be selected such that adhesive bonds heat sink 604 to the surface of dielectric structure 504. In these illustrative examples, a high strength adhesive is an adhesive that has a desired bonding strength such that adhesive 1400 withstands temperature cycling and maintains alignment of optical fibers with optical receiver 600 and optical transmitter 602. For example, the bonding strength may be from about 900 psi to about 4,300 psi.

When adhesive 1400 is applied to the surface of dielectric structure 504, the assembly of heat sink 604 with optical receiver 600 and optical transmitter 602 is placed into dielectric structure 504. In this manner, adhesive 1400 bonds the assembly of heat sink 604 with optical receiver 600 and optical transmitter 602 securely to the surface of dielectric structure 504 upon curing. The placement of the assembly may be such that optical receiver 600 is received in hole 620 and optical transmitter 602 is received in hole 622.

Figure 15:
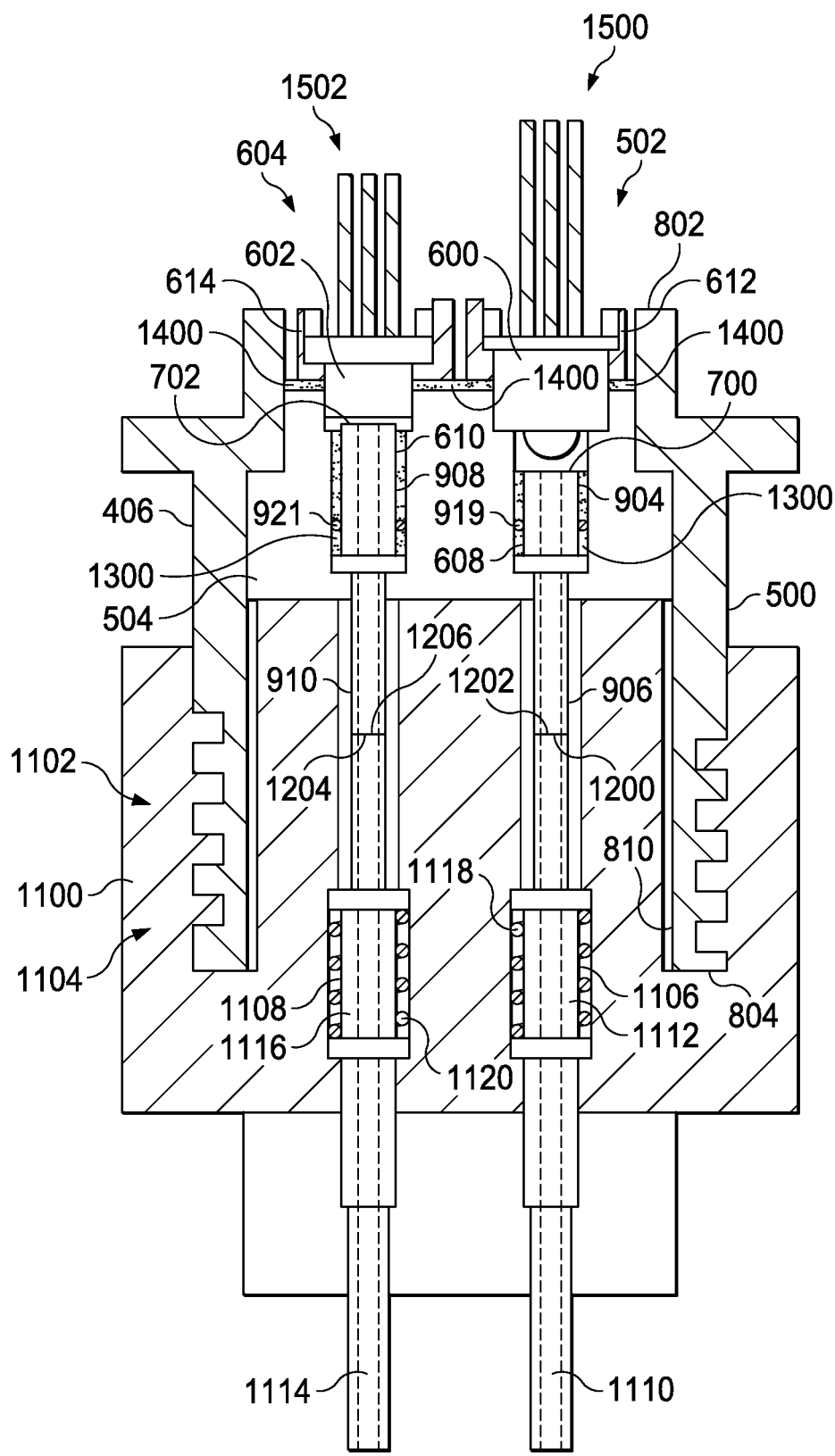

Turning now to FIG. 15, an illustration of the installation of an optical receiver and an optical transmitter in an optical connector is depicted in accordance with an illustrative embodiment. In this example, the assembly of optical receiver 600 and optical transmitter 602 in heat sink 604 is shown.

Heat sink 604 is shown placed on dielectric structure 504. This placement of heat sink 604 with optical receiver 600 and optical transmitter 602 is such that optical receiver 600 is received in hole 620 and optical transmitter 602 is received in hole 622 in FIG. 14.

Optical receiver 600 is optically connected to first pin 608 and optical transmitter 602 is optically connected to second pin 610 in this illustrative example. In this configuration, an optical signal may be sent through plastic optical fiber 1110 to determine whether signals with a desired level and quality are generated at pins 1500 on optical receiver 600.

In a similar fashion, current may be applied to pins 1502 in optical transmitter 602 to determine whether an optical signal coupled to plastic optical fiber 1114 has a desired intensity and quality by using a large area detector.

Figure 16:
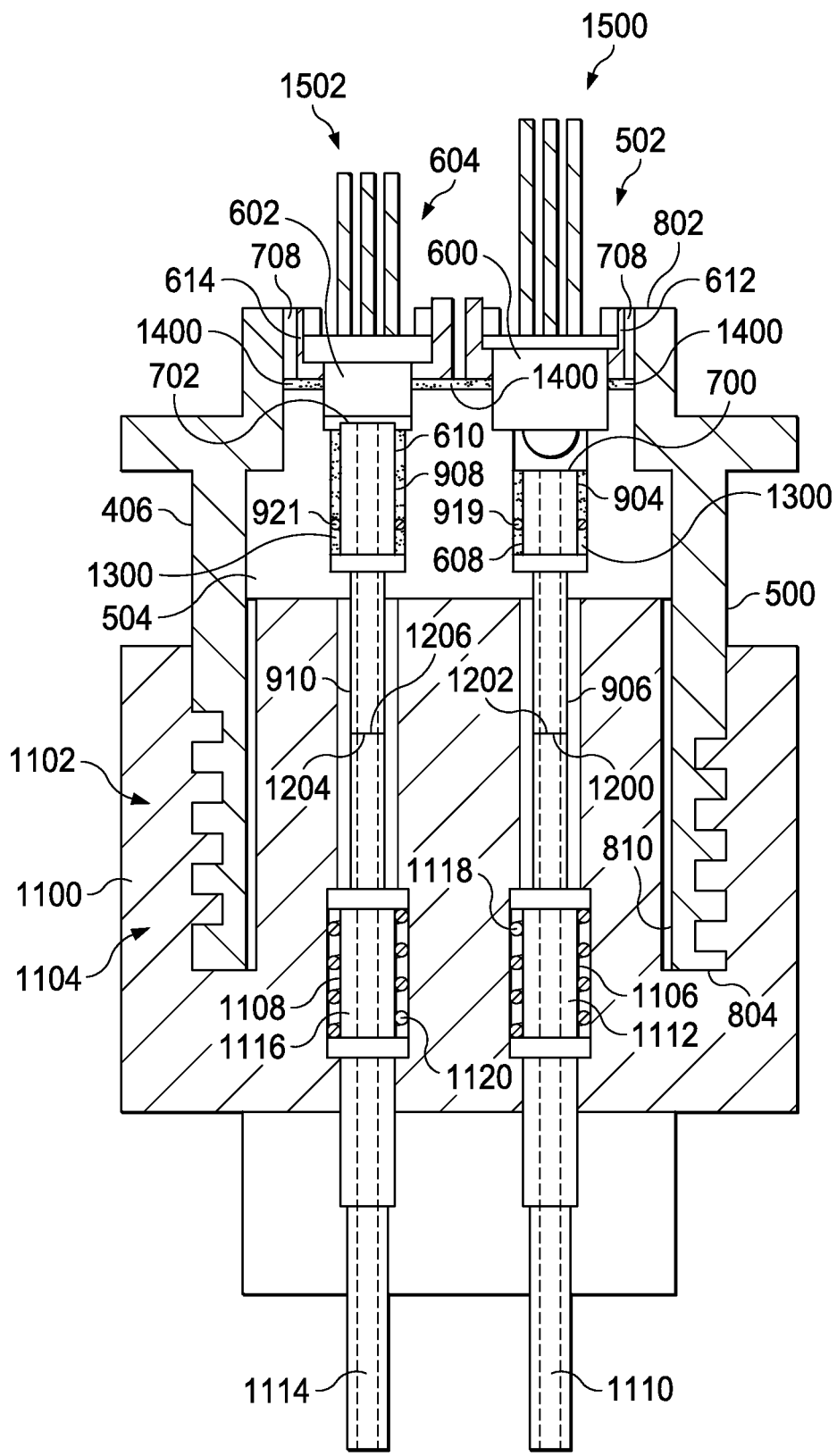

Turning now to FIG. 16, an illustration of the application of a thermal conductor is depicted in accordance with an illustrative embodiment. In this illustrative example, thermal conductor 708 is applied in an area between heat sink 604 and the inner wall of connecting structure 500. In this illustrative example, thermal conductor 708 may be a thermally conductive and electrically insulating epoxy.

In this configuration, optical connector 406 with connector 1100 may be heated together to cure adhesive 1400 and thermal conductor 708. This type of curing may be referred to as co-curing. The curing may be at about 100 degrees Celsius for about three hours. After curing thermal conductor 708 and adhesive 1400, connector 1100 may be disengaged from optical connector 406 resulting in a completed configuration for optical connector 406 as shown in FIG. 7.

The illustration of operations for manufacturing optical connector 406 illustrated in FIGS. 8-16 are not meant to imply physical or architectural limitations to the manner in which an illustrative embodiment may be manufactured. For example, other positioning systems may be used other than connector 1100. As another example, epoxy, a plastic, or other material may be added to optical receiver 600 and optical transmitter 602 after being installed onto dielectric structure 504. The epoxy, plastic, or other material may provide a seal against the environment around optical connector 406.

The illustration of the manufacturing of optical connector 406 in FIGS. 8-16 are not meant to limit the manner in which optical connector 406 may be manufactured. For example, in some illustrative examples, heat sink 604 may be placed onto dielectric structure 504 without optical receiver 600 and optical transmitter 602 being positioned partially inside hole 620 and hole 622. Optical receiver 600 and optical transmitter 602 may be positioned for desired coupling to the plastic optical fibers in first pin 608 and second pin 610 by moving heat sink 604. In this case, heat sink 604 may be placed on the surface of dielectric structure 504.

The different components shown in FIGS. 1 and 4-16 may be combined with components in FIG. 2 and FIG. 3, used with components in FIG. 2 and FIG. 3, or a combination of the two. Additionally, some of components in FIGS. 4-16 may be illustrative examples of how components shown in block form in FIG. 2 and FIG. 3 can be implemented as physical structures.

Figure 17:
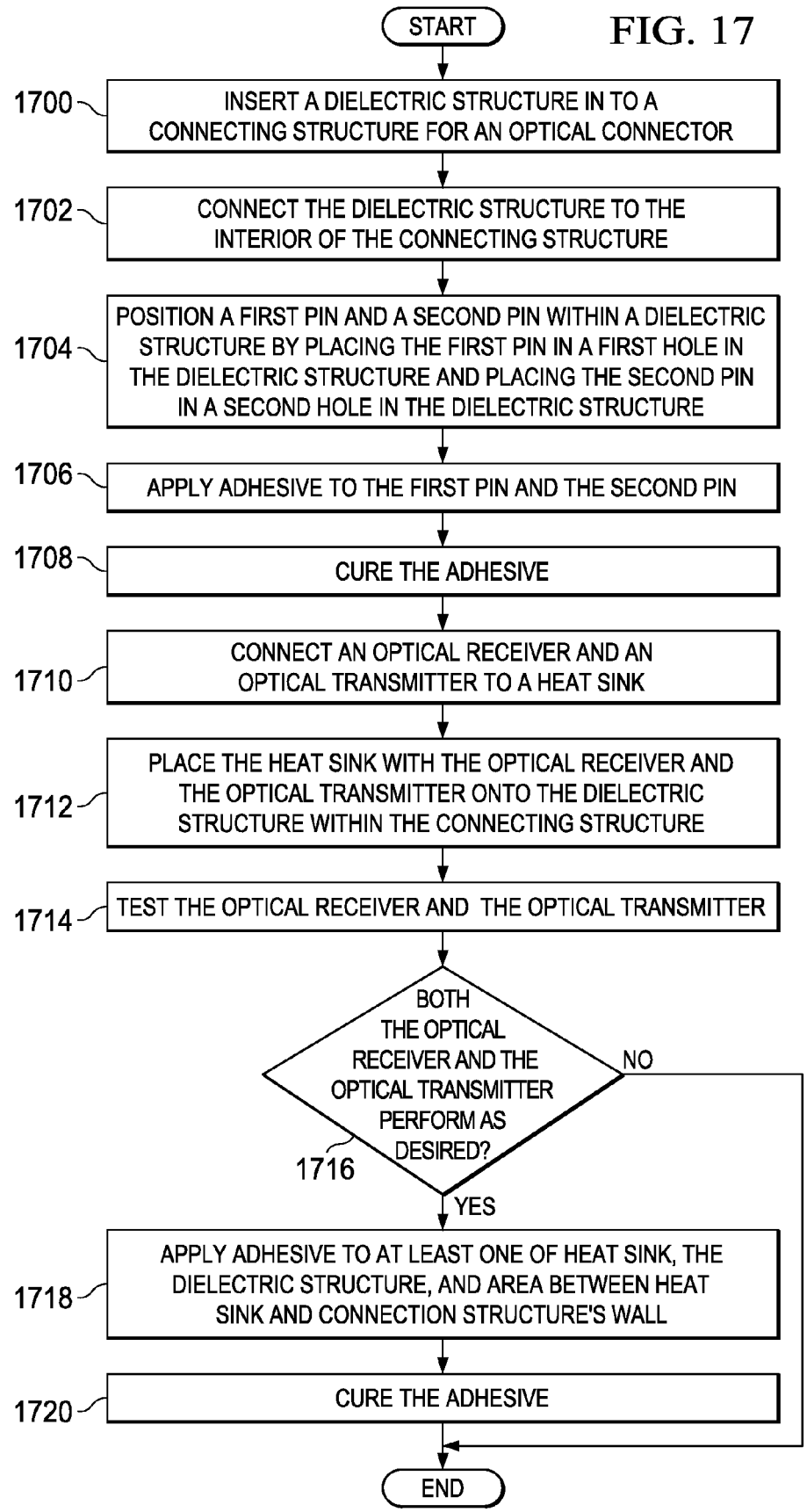
FIG. 17 an illustration of a flowchart of a process for manufacturing an optical connector in accordance with an illustrative embodiment.

With reference now to FIG. 17, an illustration of a flowchart of a process for manufacturing an optical connector is depicted in accordance with an illustrative embodiment. The process illustrated in FIG. 17 may be implemented to manufacture an optical connector such as optical connector 210 used in optical media converter 200 as depicted in FIGS. 2 and 3.

The process begins by inserting a dielectric structure in to a connecting structure for an optical connector (operation 1700). The dielectric structure is connected to the interior of the connecting structure (operation 1702). This connection may be performed in a number of different ways. For example, the connection may be made by an interference fit, an adhesive, a fastener, or some other suitable type of connecting mechanism.

A first pin and a second pin are positioned within a dielectric structure by placing the first pin in a first hole in the dielectric structure and placing the second pin in a second hole in the dielectric structure (operation 1704). Operation 1704 also may include adjusting the position of the pin using a connector with connectors having optical fibers that are biased against the first pin and second pin when the connector is connected to the support structure. This connecter may be connector 1100 in FIG. 11.

The process then applies adhesive to the first pin and the second pin (operation 1706). The adhesive is then cured (operation 1708). The curing may be performed by placing the connecting structure with the dielectric structure and the first pin and the second pin with the adhesive into an oven. The oven may be heated to about 100 degrees Celsius for about three hours when the adhesive takes the form of an epoxy.

When the epoxy is cured, the position of the first pin and the second pin may be fixed in the desired position without undesired movement. As a result, a loss of an optical connection between different components that may be connected to the first pin and second pin may be reduced or avoided.

The process then connects an optical receiver and an optical transmitter to a heat sink (operation 1710. The heat sink may be a single piece or multiple pieces depending on the particular implementation. The optical receiver and the optical transmitter may be connected to the heat sink using an adhesive in these illustrative examples.

The process then places the heat sink with the optical receiver and the optical transmitter onto the dielectric structure within the connecting structure (operation 1712). The optical receiver and the optical transmitter are tested (operation 1714). A determination is made as to whether both the optical receiver and the optical transmitter perform as desired (operation 1716).

If both the optical receiver and the optical transmitter do not perform as desired, the process terminates. At this point, components may be reworked or a new optical connector may be manufactured.

With reference again to operation 1716, if both the optical receiver and the optical transmitter perform as desired, an adhesive is applied to at least one of heat sink, the dielectric structure, and the wall of the connecting structure (operation 1718). The adhesive may be an adhesive that is thermally conductive in these illustrative examples. In other words, the adhesive may function as a thermal conductor. Next, the process cures the adhesive (operation 1720) with the process terminating thereafter.

In these illustrative examples, the heat sink is electrically insulated from the connecting structure. This insulation may be provided by the placement of the heat sink within the dielectric structure and the use of thermally conductive and electrically insulating epoxy between the heat sink and the wall of the connecting structure.

For example, the circular diameter of dielectric structure 504 is smaller than the circular diameter of the space within connecting structure 500. As a result, the thermally conductive and electrically insulating epoxy is used to fill the gap between heat sink 604 and connecting structure 500.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1800 in FIG. 18.

The use of a number of the different illustrative embodiments may substantially expedite the assembly of and/or reduce the cost of aircraft 1900. For example, optical media converter 200 with optical connector 210 may be manufactured during component and subassembly manufacturing 1806. These components may be installed during the installation of an optical network performed during system integration 1808. Further, optical connectors, such as optical connector 210 in optical media converter 200 may be manufactured and installed during maintenance and service 1814. For example, these components may be installed during refurbishment, upgrades, and routine maintenance of aircraft 1900.

The description of the different illustrative embodiments has been presented for purposes of illustration and description, and is not intended to be exhaustive or limited to the embodiments in the form disclosed. Many modifications and variations will be apparent to those of ordinary skill in the art. In some illustrative examples, connector 1100 may be used in actual connections made to optical connector 406 in addition to being used to position first pin 608 and second pin 610. Connector 1100 may provide a more reliable connection between plastic optical fiber 906 and plastic optical fiber 1110, and between plastic optical fiber 910 and plastic optical fiber 1114. With the use of housing 1112 and housing 1116, desired connections may be maintained even when vibrations may be present. In yet other illustrative embodiments, the optical fibers may be glass optical fibers in addition or in place of the plastic optical fibers.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms. In other words, an illustrative embodiment may be implemented in any platform in which optical signals and electrical signals may be used to exchange information between devices. The description of the different illustrative embodiments has been presented for purposes of illustration and description, and is not intended to be exhaustive or limited to the embodiments in the form disclosed.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An optical connector comprising:
   a connecting structure;

an optical receiver located within the connecting structure;
an optical transmitter located within the connecting structure; and
a heat sink located within the connecting structure, wherein the heat sink is configured to conduct heat away from the optical receiver and the optical transmitter and the optical receiver and the optical transmitter are thermally connected to the heat sink, the heat sink comprising a first section and a second section separated from each other, wherein the optical receiver is further located in the first section and the optical transmitter is further located in the second section, wherein the heat sink is movable along a surface of a dielectric structure connected to the heat sink within the connecting structure;
a first pin within the connecting structure and inserted into both the first portion of the heat sink and the dielectric structure; and
a second pin within the connecting structure and inserted into both the second portion of the heat sink and the dielectric structure.

2. The optical connector of claim 1 further comprising:
a connector system configured to connect the optical receiver and the optical transmitter to an optical fiber.

3. The optical connector of claim 2, wherein the connector system is configured to be connected to one of a plastic optical fiber and glass optical fiber.

4. The optical connector of claim 1 wherein the heat sink is held by the dielectric structure in the connecting structure.

5. The optical connector of claim 4, wherein the heat sink is connected to the dielectric structure by a thermal adhesive, wherein the thermal adhesive is thermally conductive and electrically insulating.

6. The optical connector of claim 4, wherein the dielectric structure has a channel system and the heat sink is mounted in the channel system further comprising:
a thermal conductor configured to connect the heat sink to the dielectric structure in the channel system and a wall of the connecting structure.

7. The optical connector of claim 6, wherein the thermal conductor is a thermal adhesive.

8. The optical connector of claim 1, wherein the heat sink is thermally connected to the connecting structure.

9. The optical connector of claim 1, wherein the heat sink is comprised of a number of materials selected from at least one of aluminum, copper, an aluminum alloy, copper-tungsten, a nickel-cobalt ferrous alloy, silicon-carbide in an aluminum matrix, and a dymalloy.

10. The optical connector of claim 1 wherein the first section further comprises a first hole and the second section comprises a second hole, the first hole and the second hole configured to receive at least one alignment tool to facilitate movement of the heat sink.

11. A method for manufacturing an optical connector, the method comprising:
connecting a dielectric structure to an interior of the optical connector;
placing a heat sink into the optical connector, the heat sink comprising a first section and a second section separated from each other, wherein the optical receiver is further located in the first section and the optical transmitter is further located in the second section, wherein the heat sink is movable along a surface of a dielectric structure connected to the heat sink within the connecting structure; and
positioning a first pin within the connecting structure and into both the first portion of the heat sink and the dielectric structure;
positioning a second pin within the connecting structure and into both the second portion of the heat sink and the dielectric structure;
connecting the first pin and the second pin within the dielectric structure in a desired position for the first pin and the second pin;
connecting an optical receiver and an optical transmitter to the dielectric structure.

12. The method of claim 11, wherein positioning the first pin and the second pin comprises:
engaging a connector with the optical connector, wherein a third pin in the connector is moved to contact the first pin and a fourth pin in the connector is moved to contact the second pin, wherein moving of the third pin against the first pin and the moving of the fourth pin to contact the second pin places the first pin and the second pin into the desired position.

13. The method of claim 11, wherein connecting the first pin and the second pin within the dielectric structure in the desired position for the first pin and the second pin comprises:
applying an adhesive to the first pin and the second pin while the first pin and the second pin are in the desired position; and
curing the adhesive.

14. The method of claim 11, wherein connecting the optical receiver and the optical transmitter to the dielectric structure comprises:
connecting the optical receiver to the heat sink;
connecting the optical transmitter to the heat sink; and
connecting the heat sink to the dielectric structure with the optical receiver and the optical transmitter connected to the heat sink.

15. The method of claim 14, wherein the heat sink is connected to the dielectric structure using a thermal adhesive.

16. The method of claim 11, wherein positioning the first pin and the second pin comprises:
placing the first pin into a first hole in the dielectric structure; and
placing the second pin into a second hole in the dielectric structure.

17. The method of claim 11, wherein the optical receiver is mounted in the first section and the optical transmitter is mounted in the second section.

18. The method of claim 11, wherein the first section further comprises a first hole and the second section comprises a second hole, the method further comprising:
inserting an alignment tool into the first hole and the second hole.

19. The method of claim 18 further comprising:
moving the heat sink using the alignment tool.

* * * * *